H. H. HATHEWAY.
HORSE HAY-RAKE.
No. 7,648. Reissued May 1, 1877.
Fig. 1.
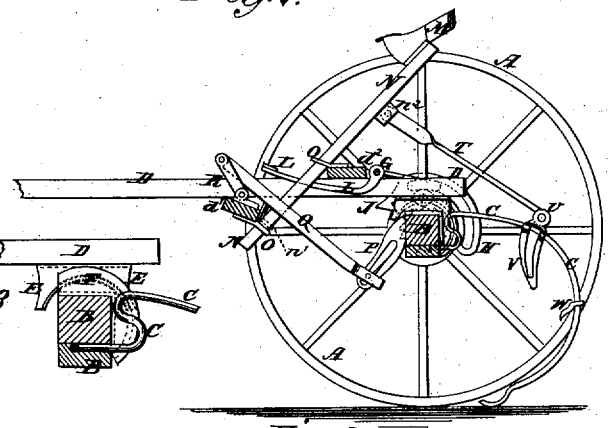
Fig. 3
Fig. 4
Fig. 2
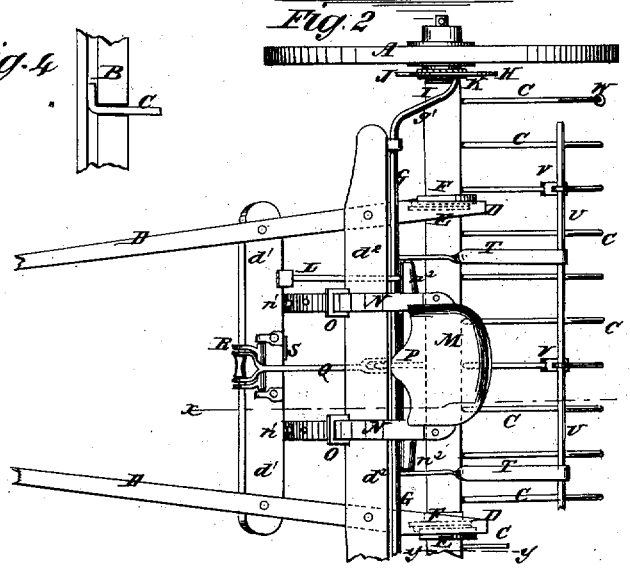
WITNESSES:
Francis McArdle,
J. H. Scarborough.
INVENTOR:
H. H. Hatheway.
BY
ATTORNEYS.
N. PETERS, PHOTO-LITHOGRAPHER, WASHINGTON, D. C.

UNITED STATES PATENT OFFICE.

HENRY H. HATHEWAY, OF CLOCKVILLE, NEW YORK.

IMPROVEMENT IN HORSE HAY-RAKES.

Specification forming part of Letters Patent No. 181,337, dated August 22, 1876; reissue No. 7,648, dated May 1, 1877; application filed February 20, 1877.

*To all whom it may concern:*

Be it known that I, HENRY HORACE HATHEWAY, of Clockville, in the county of Madison and State of New York, have invented a new and useful Improvement in Horse Hay-Rake and Gleaner, of which the following is a specification:

Figure 1 is a vertical section of my improved rake, taken through the line *x x*, Fig. 2. Fig. 2 is a top view of the same. Fig. 3 is a detail cross-section of the axle, taken through the line *y y*, Fig. 2. Fig. 4 is a detail view, illustrating the mode of securing the teeth.

Similar letters of reference indicate corresponding parts.

The object of this invention is to furnish an improved horse hay-rake which shall be so constructed that it may be used for heavy raking, and for light raking or gleaning, may be easily dumped to discharge the collected hay, will adjust itself to uneven ground, and will not scratch or catch upon the ground.

The invention will first be described in connection with the drawing, and then pointed out in the claims.

A are the wheels, which revolve upon journals attached to the ends of the axle B. The axle B is made in two parts, placed one above the other and bolted together. The adjacent faces of the parts of the axle B are grooved transversely and longitudinally, to receive the upper ends of the teeth C, which pass in through the transverse grooves of the axle B, and the ends of which are bent at right angles to enter the longitudinal groove of said axle, so that the said teeth are secured in place by bolting the parts of the axle B together. The teeth C at the rear side of the axle B are bent upward, forward, and rearward, or into S form, as shown in Fig. 1, so that when the teeth are strained to their full capacity in heavy raking the upper bend will rest against the axle, and cause all the teeth to work together. The transverse grooves of the axle B are made of such a depth as will give the teeth sufficient vertical play to enable them to act independently in light raking. The bodies of the teeth C are bent nearly into arcs of circles, and their lower ends are bent downward, forward, and upward, to form runners to slide along the ground and prevent the teeth from scratching or catching. D are the thills, which are connected by the cross-bars $d^1$ $d^2$, and to the outer sides of the rear ends of which are attached plates E, the lower edge of which is concaved upon the arc of a circle, and has an outwardly-projecting flange formed upon it to enter a groove in the inner sides of the semicircular flanges formed upon the angle-plates F, attached to the upper and rear sides of the axle B. By this construction the axle B will be free to turn upon the thills D, to raise and lower the teeth C, and by turning the thills down beneath the axle B the thills and axle will be disconnected without detaching either of the plates E F. At the rear edge of the rear cross-bar $d^2$ of the thills D is placed a rod, G, which works in bearings attached to the said cross-bar $d^2$, and upon the ends of which are formed cranks $g'$. The arms of the cranks $g'$ enter curved slots in the semi-ring plates H, the lower forward part of which is pivoted to brackets or angle-plates I, attached to the upper side of the axle B. Upon the forward end of the plates H is formed a hook, J, to catch upon a ratchet-wheel, K, attached to the inner ends of the hubs of the wheels A. If desired, the brackets I and slotted plates H may be set in from the ends of the axles B, and the hooks J formed upon the outwardly-projecting ends of the pivots of the said plates H. By this construction, by turning the rod G, the cranks $g'$ will tilt the slotted plates H, and cause the hooks J to engage with the teeth of the ratchet-wheels K, so that the revolution of the wheels A will turn the axle B, and raise the teeth C to drop the collected hay. When the cranks $g'$ reach the rear ends of the slots of the plates H, they press down the rear ends of said plates, which raises the hooks J from the ratchet-wheels K, and allows the rake-teeth C to again drop to the ground. The rod G is turned to dump the rake by means of a foot-lever, L, rigidly attached to said rod, and which projects forward into such a position that it may be readily operated by the driver from his seat M. The seat M is attached to the upper ends of two bars, N, which may be elastic, to give spring to the said seat. The bars N pass down through keepers or sockets O, attached to the forward edge of the rear cross-bar $d^2$, and to the rear edge of the forward cross-bars $d^1$ of the thills, and are supported by pins $n^1$, passed through the said bars N above the lower keepers O. Several holes are formed in the bars N to receive the pins $n^1$, so that the seat M can be raised and lowered to adjust it to the size of the driver. To the forward side of the axle B is attached an arm, P, which projects downward and forward, and is slotted longitudinally to receive the pin by which the rear end of the bar Q is pivoted to it. The forward end of the bar Q is forked, and is pivoted to the ends of the short U-bar R, which is pivoted at its bend to the forward cross-bar $d^1$ of the thills D. The pivot that connects the bars Q R has a roller placed upon it to adapt it to serve as a rest for the driver's foot.

When the teeth C are in working position the bars Q R are folded together above the cross-bar $d^1$, as shown in Figs. 1 and 2, and the driver, by putting his foot upon the pivot of said bars, can hold all the teeth firmly to their work. When the teeth C are raised to discharge the collected hay the bars Q R are extended into line with each other, and the driver, by putting his foot upon the connecting-pivot of said bars, can easily hold the teeth raised. The bars Q R can be locked extended, to hold the teeth C raised, by hooking upon the bar R a hook, S, pivoted to the rear edge of the cross-bar $d^1$.

To the seat-bars N, or to a cross-bar, $n^2$, attached to said seat-bars, are pivoted the ends of two bars, T, to the lower ends of which is attached a bar, U, which rests upon the upper middle parts of the teeth C when in a working position. From the rod U are suspended a number of fingers, V, through holes in the upper parts of which the teeth C pass, and which project down into the cavity of the said teeth. The fingers V keep the hay from rolling and twisting in the rake, and also push the hay off the said teeth when they are raised to discharge the collected hay.

To the middle parts of the side teeth or all the teeth C are attached fingers or hooks W, to catch upon the collected hay and prevent it from twisting or rolling together, and from working out at the ends of the rake.

Having thus described my invention, I claim as new and desire to secure by Letters Patent—

1. The rake-teeth C, provided with S-shaped bends at the rear side of the axle B, substantially as herein shown and described.

2. The rake-teeth C, having their lower ends bent downward, forward, and upward to form runners to slide upon the ground, substantially as herein shown and described.

3. A flexible rake-tooth loosely attached to axle and having bends that support it against axle in heavy work, but drop in gleaning or other light work, as set forth.

4. The downwardly-projecting axle-arm P, slotted and combined with bars Q R and cross-bar $d^2$, as and for the purpose set forth.

HENRY HORACE HATHEWAY.

Witnesses:
NANCY A. HATHEWAY,
HONORA HENRIETTA HATHEWAY.